Dec. 15, 1936.  J. GOTTFRIED  2,064,425
COIN ASSORTING AND SELECTING MECHANISM
Filed July 16, 1932  7 Sheets-Sheet 2
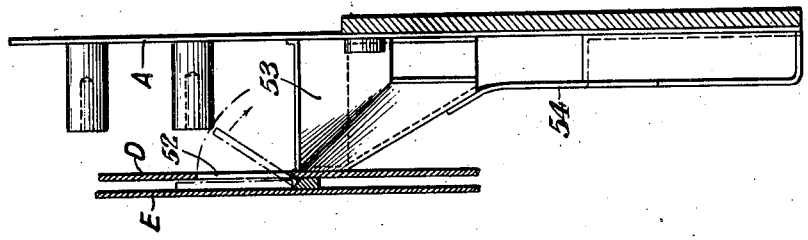
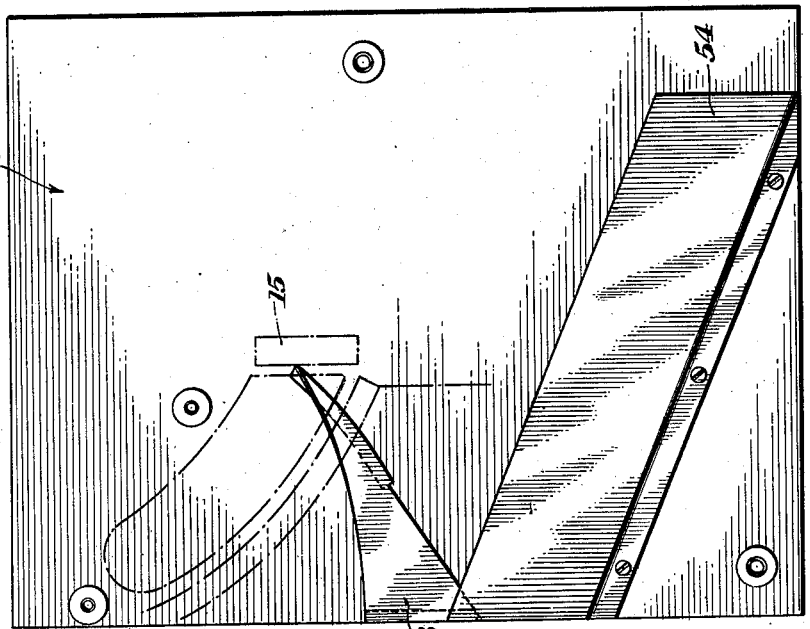
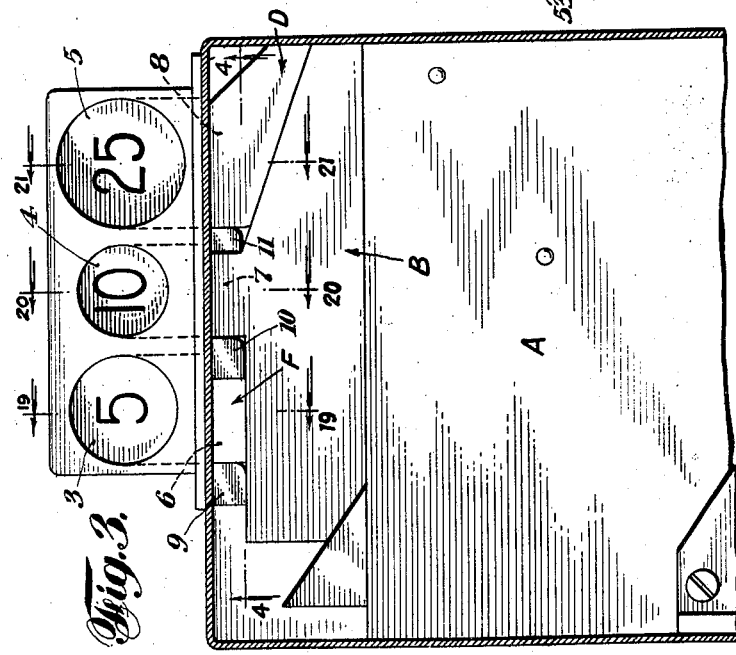
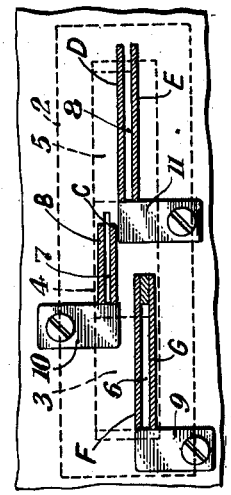
INVENTOR
John Gottfried
BY
Prindle Bean & Mann
ATTORNEY Dec. 15, 1936.   J. GOTTFRIED   2,064,425
COIN ASSORTING AND SELECTING MECHANISM
Filed July 16, 1932   7 Sheets-Sheet 3
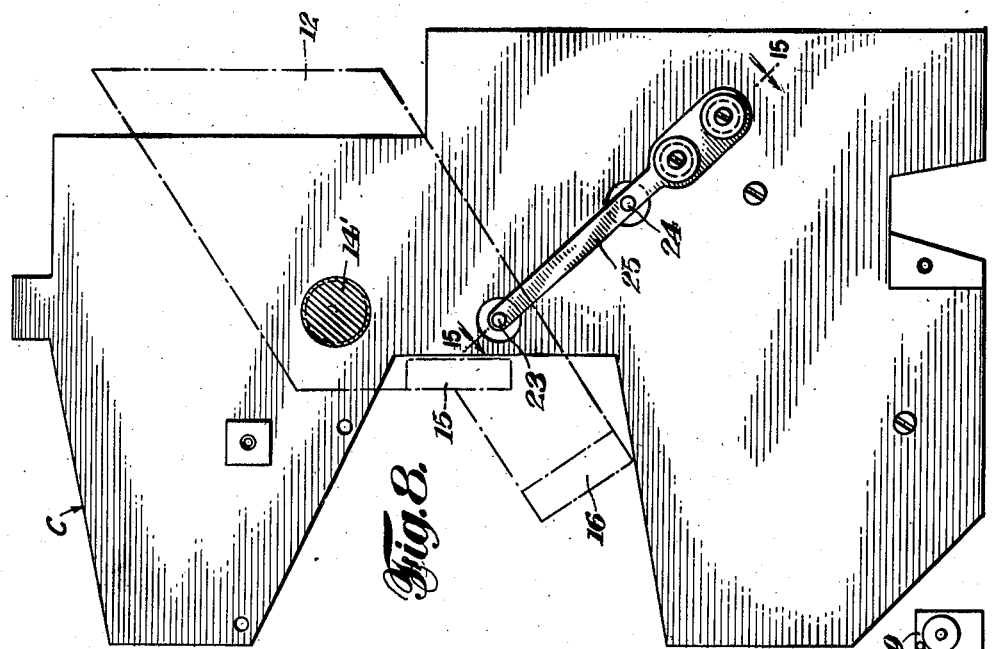
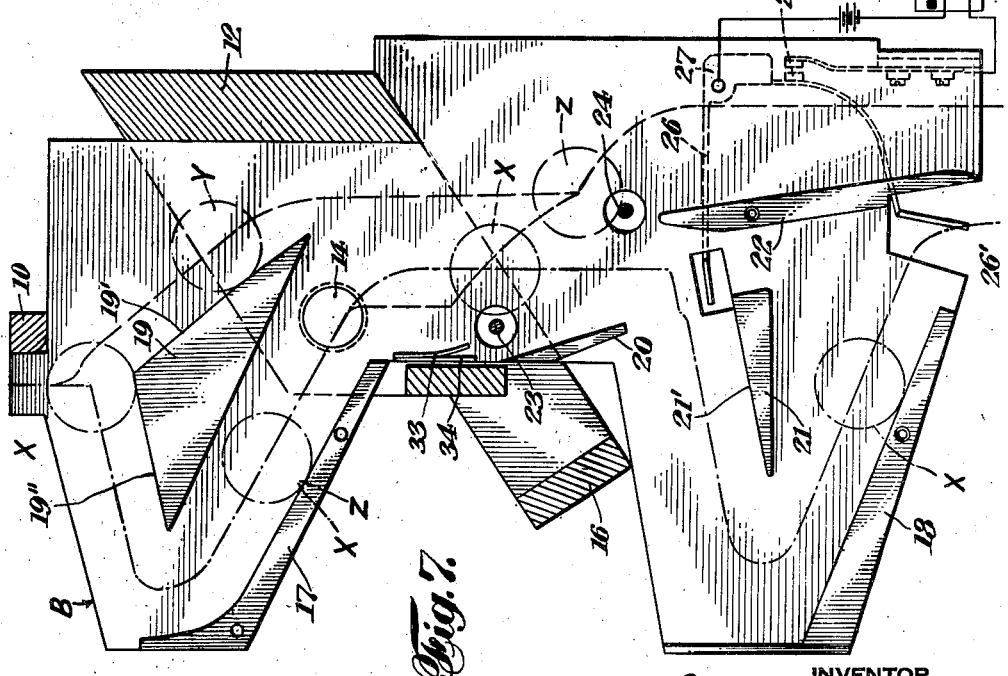
INVENTOR
John Gottfried
BY
Prindle, Bean & Mann
ATTORNEY Dec. 15, 1936.  J. GOTTFRIED  2,064,425
COIN ASSORTING AND SELECTING MECHANISM
Filed July 16, 1932    7 Sheets-Sheet 4
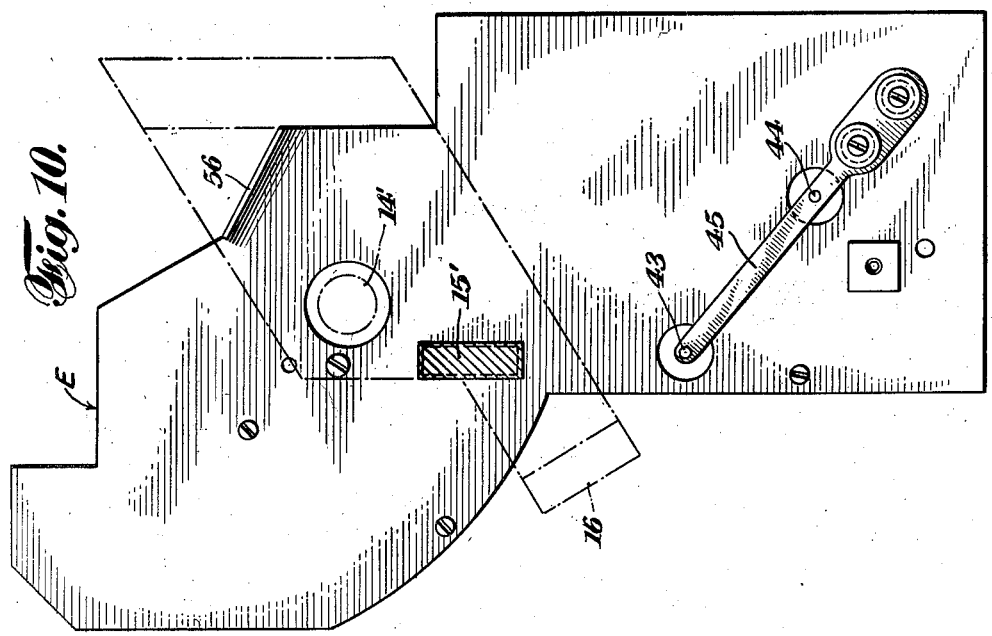
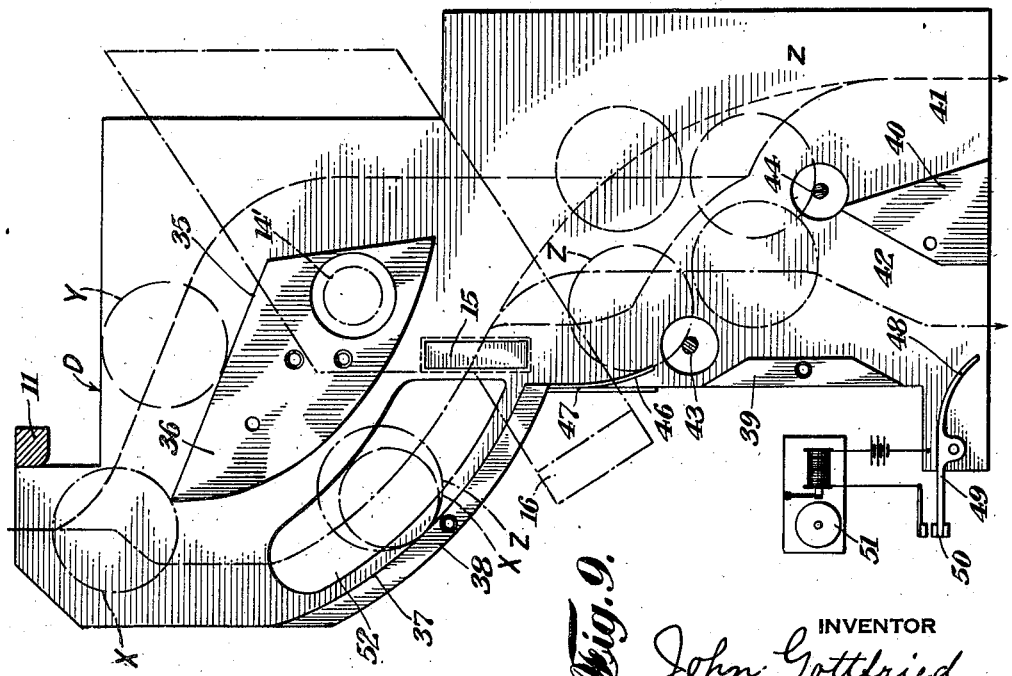
INVENTOR
John Gottfried
BY
Prindle, Bean & Mann
ATTORNEY Dec. 15, 1936.  J. GOTTFRIED  2,064,425
COIN ASSORTING AND SELECTING MECHANISM
Filed July 16, 1932  7 Sheets-Sheet 5
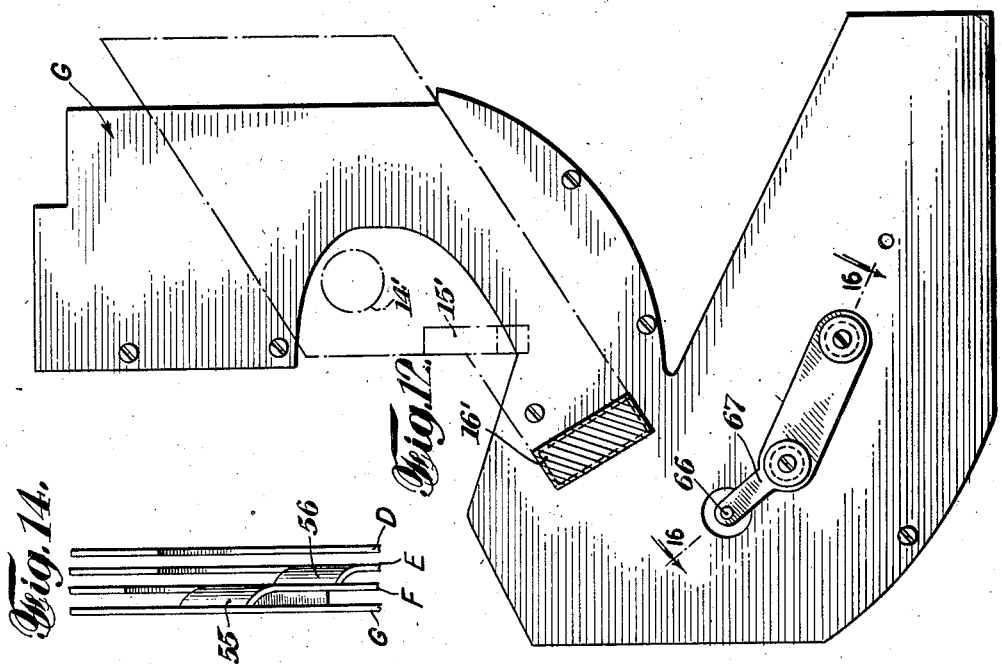
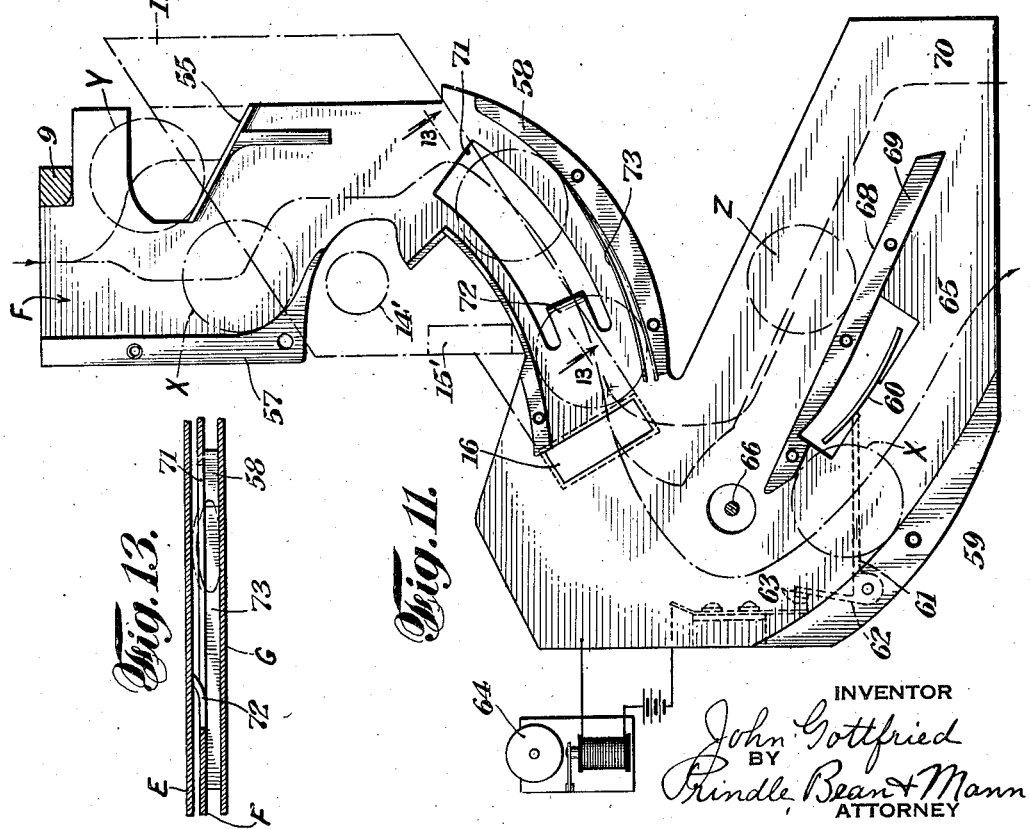
INVENTOR
John Gottfried
BY
Prindle Bean + Mann
ATTORNEY Dec. 15, 1936.  J. GOTTFRIED  2,064,425
COIN ASSORTING AND SELECTING MECHANISM
Filed July 16, 1932  7 Sheets-Sheet 6
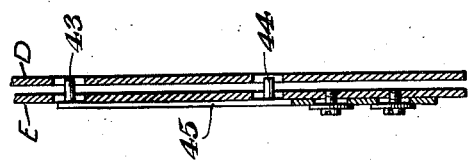
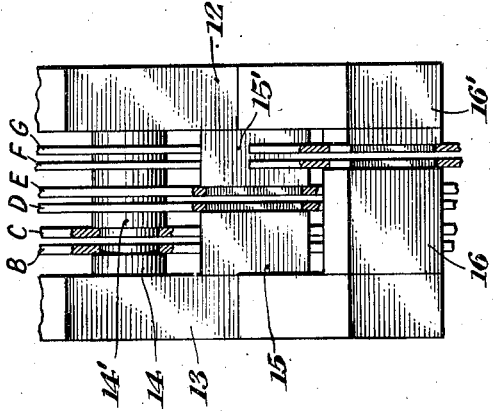
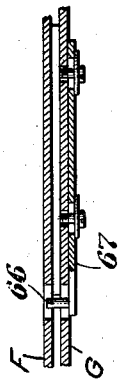
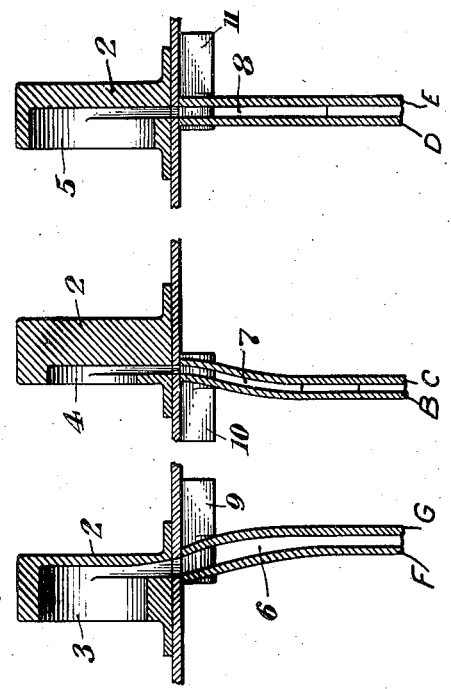
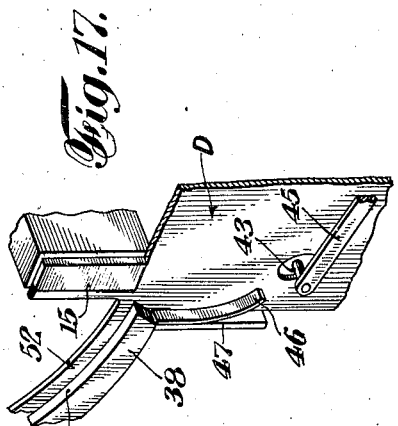
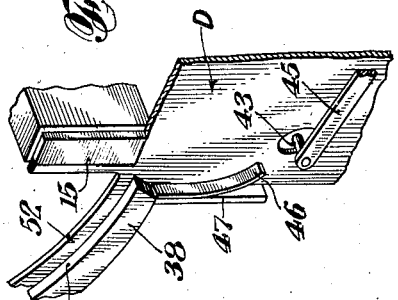
INVENTOR
John Gottfried
BY
Prindle Bean & Mann
ATTORNEY

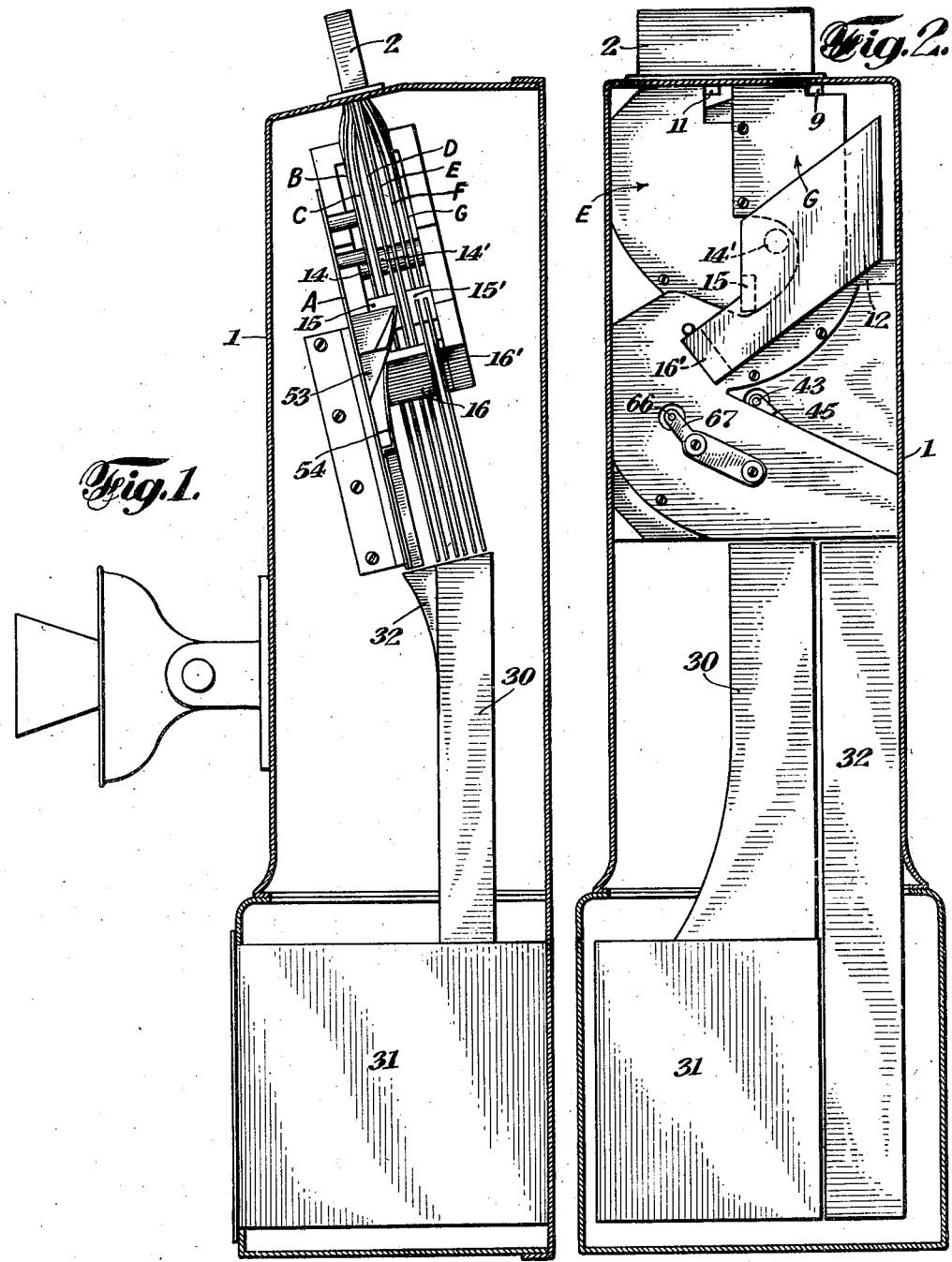

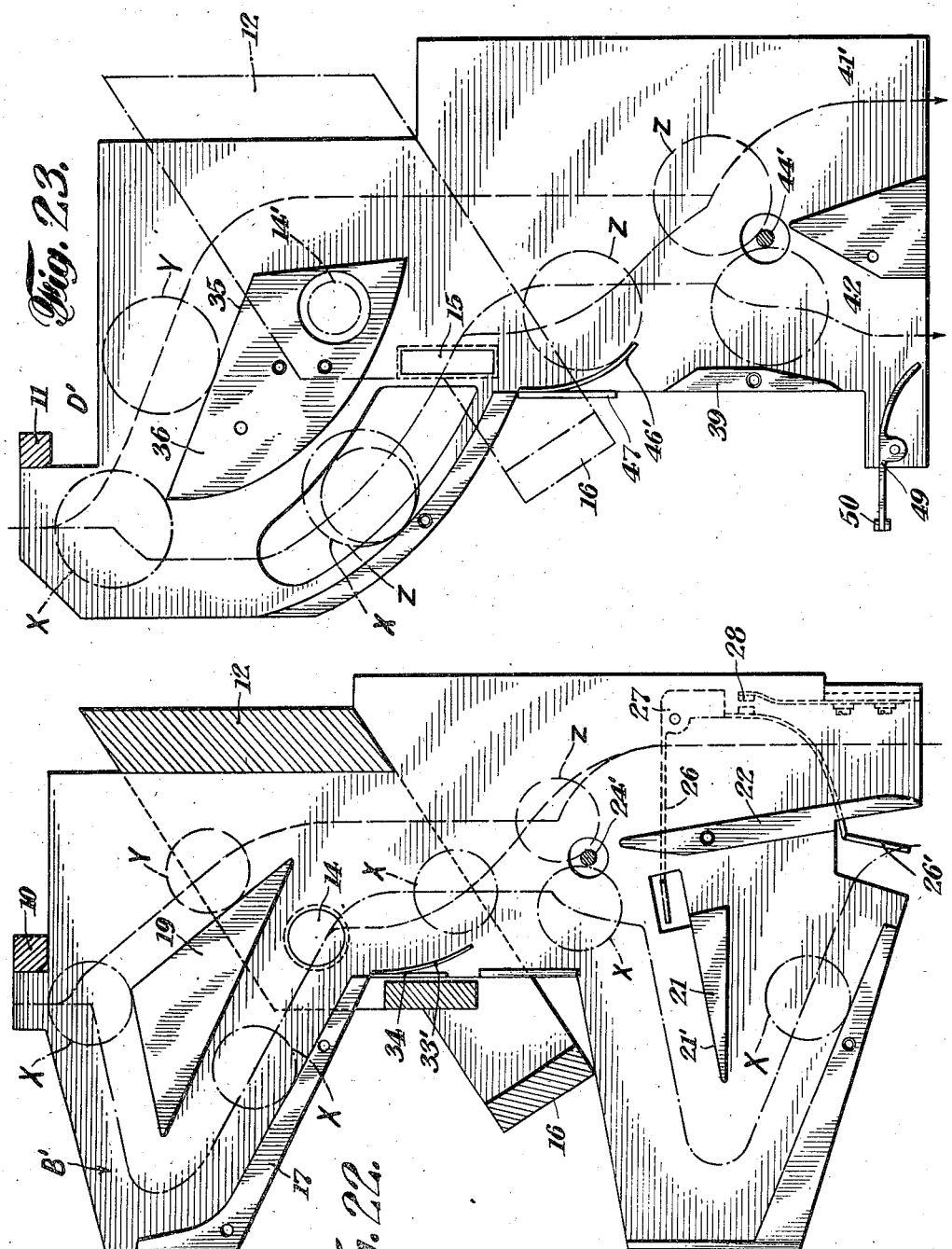

Patented Dec. 15, 1936

2,064,425

UNITED STATES PATENT OFFICE 2,064,425

COIN ASSORTING AND SELECTING MECHANISM

John Gottfried, New Haven, Conn., assignor to B. & G. Coin Selectors, Incorporated, Bridgeport, Conn.

Application July 16, 1932, Serial No. 622,856

6 Claims. (Cl. 194—101)

This invention relates to improvements in coin assorting and selecting mechanism, and has for its object the provision of a mechanism for effectively and efficiently separating counterfeit coins, slugs, and so forth, from genuine coins in all kinds of coin controlled and coin actuated mechanisms.

This mechanism is applicable to all automatic dispensing and merchandising devices, telephone pay-stations, subways and elevated turnstiles and other fare prepayment devices, and in fact, may be used universally for the separation of good from bad coins in apparatus of all kinds.

Of course, many devices have been made and used for this purpose, but as far as this inventor is aware, most of them have their limitations and disadvantages, and this present mechanism operates simply and effectively to give a complete and safe handling of all coins or slugs inserted into coin controlled apparatus and deposits, or retains the genuine coins inserted in the proper openings or slots safely within the apparatus and ejects or returns the spurious coins or slugs and also genuine coins inserted in an improper opening or slot.

To the accomplishment of the foregoing and such other objects as may hereinafter appear, this invention consists in the construction, combination and arrangement of parts hereinafter described and then sought to be defined in the appended claims, reference being had to the accompanying drawings which show, merely for the purpose of illustrative disclosure, several embodiments of this invention, including modifications, it being expressly understood, however, that various changes may be made in practice within the scope of the claims without digressing from my inventive idea.

In the embodiment of this invention which is disclosed in the drawings and which will be described herein, I have shown my invention applied to a telephone pay station and adapted to handle a plurality of coins such as five cent pieces, ten cent pieces and twenty-five cent pieces. It is, of course, to be understood that my invention may be embodied in an apparatus which will handle additional and other coins, and also in an apparatus which will handle one coin only. Furthermore, as stated before, the invention may be readily embodied in apparatus used in connection with many other coin controlled and actuated mechanisms for merchandising and other purposes.

In the drawings—

Figure 1 represents a form of telephone pay station box, the box being cut away and shown in section so that the mechanism embodying this invention is shown in side elevation.

Figure 2 is a view similar to Figure 1, but taken at right angles thereto so as to show the coin controlled mechanism in rear elevation.

Figure 3 is a view taken on an enlarged scale of the upper portion of the box, which is cut away and shown in section so as to give a front elevational view of the upper portion of the coin controlled mechanism.

Figure 4 is a horizontal cross section taken substantially on line 4—4 of Figure 3.

Figure 5 is an inside elevation of the front or outside plate A of my mechanism.

Figure 6 is an end view of the same, the nearest pair of plates B and C being shown partially in section.

Figure 7 is an elevation of the second plate B, parts being shown in section, this plate with its companion plate C (Figure 8) providing the chute or path for the coins inserted in the ten cent opening.

Figure 8 is an elevation of plate C, this being the complementary plate to B (Figure 7).

Figure 9 is an elevation of plate D, which, together with plate E (Figure 10) provides the chute or path for coins inserted into the twenty-five cent opening.

Figure 10 is an elevation of plate E, which complements plate D (Figure 9).

Figure 11 is an elevation of plate F, which, together with plate G (Fig. 12) provides the chute or path for coins inserted into the five cent opening.

Figure 12 is an elevation of plate G, which complements plate F (Figure 11).

Figure 13 is a detailed sectional view taken substantially on line 13—13 of Figure 11.

Figure 14 is an end elevation of part of the construction looking from the right hand side of Figure 11.

Figure 15 is a sectional view taken substantially on line 15—15 of Figure 8.

Figure 16 is a cross sectional view taken substantially on line 16—16 of Figure 12.

Figure 17 is a detailed perspective view of part of the structure shown in Figure 9 for controlling and handling the passage of coins inserted into the twenty-five cent opening.

Figure 18 is a fragmentary elevational view of the magnet and the plates B, C, D, E, F, and G partly in section and to show the arrangement of such plates with respect to the pole pieces of the magnet.

Figures 19, 20, and 21 are vertical transverse sections taken substantially on lines 19—19, 20—20, and 21—21 respectively of Figure 3.

Figure 22 is an elevational view corresponding to Figure 7 showing a somewhat modified form of construction.

Figure 23 is a view similar to Figure 9 showing a somewhat modified form of construction.

In the various figures of the drawings my invention has been embodied in a mechanism which may be inserted in a standard telephone pay station box designated generally by the reference character 1. The telephone equipment mounted within and associated with this box is not shown because that forms no part of my invention. The apparatus and wiring for giving an audible signal to the operator to indicate that the proper coin has been deposited are shown largely diagrammatically in Figures 7, 9, and 11. Aside from the actuating means therefor, and its location, this mechanism forms no part of my invention.

The box 1 is provided with the standard form of coin inlet 2 having the coin receiving openings 3, 4, and 5, which are of a sufficient size and adapted to receive respectively five cent pieces, ten cent pieces and twenty-five cent pieces. The coins being inserted in these openings and the pressure of the thumb or finger of the inserter being removed, the coins will drop by gravity into their respective chutes 6, 7, and 8, see Figures 4, 19, 20, and 21 particularly, and thence be started on their path of movement through the apparatus.

The apparatus includes a magnet of proper form and construction and having a plurality of properly separated poles or pole pieces and also a plurality of plates B—C, D—E, and F—G, arranged in pairs as indicated, to provide a chute or passageway for different coins between the proper pole pieces. An outside plate A is also provided as a supporting means for the magnet and the other plates, as well as a supporting means for certain chutes.

The slots 6, 7, and 8 previously referred to and shown in Figure 4, are formed by the upper portions of the respective pairs of plates F—G, B—C, and D—E, see Figures 19, 20, and 21, and of course are offset from each other so that coins inserted in the respective openings do not interfere with each other and have their own path of movement through the mechanism. A bar magnet, or its equivalent, 9, 10, and 11 is associated with each of said openings 6, 7, and 8 so as to deflect magnetic coins which may be inserted into the respective coin receiving openings 3, 4, and 5.

The main magnet is designated generally by the reference character 12 and is of general yoke shape having side portions 13 so as to encircle the collective pairs of plates B—C, D—E, and F—G. This magnet is of sufficient size so that it may have a plurality of pairs of opposed poles or pole pieces which may be so arranged as to be positioned in the paths of movement of the various coins. This is arranged so that one pair of pole pieces will not affect the movement of any coins through the apparatus, except those passing through the associated chute or path. These pairs of pole pieces are designated 14 and 14', 15 and 15', 16 and 16' respectively, and their ends are adapted to fit within corresponding openings formed in their respective pairs of plates B—C, D—E, and F—G, see particularly Figure 18 of the drawings.

For the purpose of simplicity, the description of the plates will be begun with the pair in first position looking at the front of the machine, this pair of plates being designated B—C and shown in elevation, particularly in Figures 7 and 8. The chute or path provided by these plates is adapted to receive and handle all coins inserted into the ten cent piece opening 4. As is seen from Figure 7, the plate B is provided with edge flange portions 17 and 18 and intermediate shouldered projections 19, 20, 21, and 22 which, when the flat plate C is placed thereon form the chutes or paths for the coins. Any coin or slug inserted into the opening 4 will first be subjected to the magnet 10 and if composed of magnetic material will be deflected so as to pass down the shoulder 19' of the projection 19 toward the right side of plate B looking at Figure 7, whereas a coin or slug of non-magnetic material will pass to the left along incline 19''. This incline and flange 17 is arranged so that the coin or slug passes beyond the end of flange 17 at a certain speed between the pole pieces 14 and 14' of magnet 12 so as to cut the magnetic flux lines and thus form eddy currents with the resultant retarding action on the coin or slug. It is well known that coins or slugs of different alloys are differently affected. In other words, some will be retarded more than others. Therefore, the inclines 19'' and 17, and also the pole pieces, are arranged so that a genuine coin will have a certain definite path of movement, due to the speed with which it passes between the pole pieces 14 and 14' so as to be deposited in the proper receptacle, whereas a spurious coin or slug will have a different path of movement and controlled so as to be ejected or passed from the machine. In the drawings the genuine coin is designated X, the spurious magnetic coin or slug is designated Y and the non-magnetic coin or slug is designated Z.

The control of the spurious coins or slugs is accomplished with the aid of pins or rods 23 and 24 which are secured to the arm 25 fastened to the outside of plate C, the pins 23 and 24 passing through suitable openings in the plates so as to extend through the normal path of movement of the coins. These two pins, 23 and 24, when in position, are so arranged as to be spaced apart sufficiently to permit the passage therebetween of a genuine coin of proper denomination after passing through the pole pieces 14 and 14'. Such genuine coin X will therefore drop upon the arm 26 of lever means 27 to make contact at 28 to cause the sounding of the electric bell 26. The genuine coin then passes over the inclined face 21' of the projection 21 and down the inclined face of flange 18 until it hits another arm 26' of lever 27 to cause the second contact at 28 and a second sounding of the electric bell. This bell is audible to the operator. After actuating the lever arm 26', the genuine coin drops into the chute 30, see Figures 1 and 2, where it may be temporarily retained as is customary in telephone practice and thence later passed to the receptacle 31.

The magnetic spurious coin or slug Y passing down incline 19' will drop upon the pin rod 24 so as to be deflected to the right of the projection 22 and through the path formed thereby into the chute 32, see Figure 2 of the drawing particularly. The non-magnetic spurious coins or slugs will be affected in two ways by passage between the pole pieces 14 and 14', that is, with respect to the speed of movement of the genuine coin. Certain of these spurious coins will be retarded more than others. Those that are retarded most will drop upon the first pin 23 and then be deflected directly into the path provided by the projection 22 or else to the second pin 24 and then deflected into said path. In order to insure that these slow spurious coins engage the pin 23 in proper position a deflecting element 33 is provided beneath the end of the flange 17 and this deflecting element is shielded by suitable non-magnetic material 34 from the adjacent pole pieces 15 and 15' of the magnet 12. The speedier spurious coin after passing between the pole pieces 14 and 14' will move directly into the path provided by the projection 22 or will be deflected thereinto by engaging the pin 24. Of course, any coin passing through this last mentioned path will have no effect upon the bell and the inserter will secure no service at all.

It is seen, therefore, from this description, that a genuine coin only of the proper denomination will be passed through the proper path to give the required signal and that all spurious coins and slugs will be passed through another path entirely.

It will be understood that the general constructions of the other pairs of plates D—E and F—G are similar to that of the plates B—C just described and that the general theory of operation is the same. Of course, all the plates are so constructed and arranged with cut out portions to permit the various coins to pass through their respective paths without being affected by the pole pieces of the magnet 12 which are designed to affect the other coins and that these plates are so arranged as not to interfere with the proper operation of the device as a whole. This will be obvious from a consideration of the various views of the drawings.

Now referring to plates D and E, which are shown in Figures 9 and 10 and which complement each other to provide the chute or path for coins inserted in the twenty-five cent piece opening 5 (Figure 3), it is seen that the magnet 11 will pull magnetic coins or slugs to the right and cause them to pass along the inclined surface 35 of the projection 36 and that the non-magnetic coins or slugs will pass to the left of the projection 36 onto the curved downwardly inclined track 37 provided by the edge flange 38 which causes said non-magnetic articles to pass between the pole pieces 15 and 15' of the magnet so as to be subjected to the influence, above described. Plate D is provided with the edge flange or projection 39 and the bottom projection 40 which divides the chute into the path 41 for spurious coins or slugs and the path 42 for genuine coins of the proper denomination. Pins or rods 43 and 44 are secured to the arm member 45 which is attached to the outside of plate E and projected through suitable openings into the chute or path. These pins are spaced sufficiently and so arranged as to permit the passage of a genuine coin of the proper denomination between them without striking either and thence into the path 42. A spurious coin or slug will be deflected by said pins or rods 43 and 44 to the right into the path 41 and then into the chute or other receptacle 32.

In these figures, the genuine coin is again designated by the reference character X, the spurious magnetic coin or slug by the reference character Y and the non-magnetic spurious coin or slug by the reference character Z. A magnetic coin or slug inserted into the opening 5 will be drawn by a magnet 11 so as to pass down the inclined face 35 to drop upon the pin or rod 44 so as to be deflected into the path 41. The non-magnetic spurious coin or slug will pass down between the pole pieces 15 and 15', the slow one being deflected by pin 43 and also pin 44 and the fast one being deflected by pin 44 into the path 41. The slow spurious coin or slug will be directed so as to properly engage the pin 43 by means of the deflecting member 46 located beneath the lower end of flange member 38, the non-magnetic shield member 47 being provided to protect the coins from the influence of the pole pieces 16—16'.

The genuine coin of proper denomination is so retarded in its passage between the pole pieces 15 and 15' that it will drop between the pins or rods 43 and 44 and pass through path 42 engaging and actuating arm 48 of lever 49 to make contact at 50 to sound the electric bell 51. The coin then passes to the chute and receptacle 30—31 for good coins.

If a coin of smaller size is inserted into the opening 5 it will be caused to fall sidewise through plate D, which is provided with the arcuate shaped opening 52 substantially paralleling flange member 38. The smaller coin being thus unsupported on one side will fall to the right, see Figure 6, and into the trough member 53 and thence to a second inclined trough 54 to be ejected from the machine or to drop into the chute or receptacle 32 for the bad coins.

Plates F and G, Figures 11 and 12, complement each other to provide the chute or path for coins and slugs inserted into the five cent opening 3. Such articles are first subjected to the influence of steel magnet 9 which will draw magnetic articles to the right so that they will engage the downwardly inclined and curved flange 55 (see Figure 14), sliding down the same to engage a similar downwardly inclined and curved flange 56 provided on plate E which operates to guide said magnetic article into the path provided for the magnetic articles by plates D and E (see Figures 9 and 10). Therefore, the magnetic article inserted in the five cent opening will eventually pass into the path 41 for the spurious coins or slugs inserted in the twenty-five cent opening and from thence to the chute or receptacle 32, as previously described.

Non-magnetic articles inserted into the five cent opening will pass along the flange 57 and then down upon the arcuate shaped flange 58 being discharged between the poles 16 and 16' of the magnet. Such coin or slug will be retarded in accordance with its composition, the spurious coins or slugs being retarded to a greater extent than the genuine coin of proper denomination. This latter again designated X, will fall upon the curved face of flange member 59 and engage plate 60 on one end of arm 61 of lever 62 making the contact at 63 to sound the electric bell 64. The coin then passes through path 65 into the chute or receptacle 30—31.

A pin or rod 66 is mounted upon the end of arm 67 secured to plate G and extending through openings in the plates into the path of movement of the spurious coins or slugs. The speedier of such coins or slugs will be deflected by said rod or pin 66 onto the inclined face 68 of the projecting member 69 which guides the coin to discharge it into the path 70 and thence into the chute or receptacle 32. The slower spurious coin or slug will drop directly upon the inclined surface 68 and follow the same path of movement.

Means is also provided in connection with plates F and G for slowing up smaller coins or slugs and those which are lighter in weight than the genuine coins of proper denomination. This means includes an arcuate shaped slot 71 provided in said plate F paralleling flange 58 which permits a smaller coin to lean or tilt as indicated in Figure 13 and then to be brought back into position within its path by means of the curved or bent finger 72. These movements act to reduce the speed of such a coin so that it will eventually fall upon the inclined face 68 of member 69 and pass into the proper chute for the spurious article. The curved spring member 73 may be provided on the upper face of flange 58 and this will result in slowing up the passage of a light spurious article so that it can not pass through the pole pieces 16 and 16' with sufficient speed to enter the path 65 for the genuine coins of proper denomination. Frictional engagement of such spurious article with the walls of this passage will accomplish this result.

In Figure 22 I show a slightly modified form of construction to be used in connection with plate B and have called this plate B'. The only change in the construction of these parts is in the deflecting member 33' which is longer than the deflecting member 33 and which permits the slower moving spurious articles to pass therealong and be deflected over to pin or rod 24' and into the right hand path for spurious articles. This results in the elimination of the pin or rod 23 of plate B, the operation of the structures being the same.

Figure 23 is a view of plate D similarly modified and I have therefore designated this plate D'. The only substantial change has to do with the deflecting member 46' which is made substantially longer so as to cause the slow moving spurious article to pass over on to the pin 44' and into the path 41' for the spurious articles. This results in the elimination of the pin or rod 43, shown in Figure 9, but the operation of the mechanism is substantially the same in other respects.

It is therefore seen that the movement of articles inserted into this mechanism is governed by the retarding action due to passing the articles between the poles of the magnet and that the course of these articles may be predetermined by the construction of the chutes or paths and deflecting means and the relative arrangement of these parts with respect to each other and the pole pieces of the magnet. This construction provides for the handling of coins and slugs of all kinds, weights and sizes and compositions and will effectively separate the spurious coins or slugs from the genuine coins of proper denomination. It will even separate silver from copper and aluminum from silver, which separation has not been accomplished heretofore, as far as applicant is aware.

It is important to note that in this construction a single magnet is utilized to effect the separation of coins of a plurality of denominations. Of course, the construction and principle may be used for a single coin in any particular apparatus or for a plurality of coins in other apparatus. The control for the small coins and slugs and for the light coins and slugs is equally effective.

I call the path for the proper genuine coins or checks, the deposit pathway, and that for the improper and spurious coins and checks, the discharge pathway. This terminology is used for convenience, merely, without regard to the disposition made of the coins and checks after they pass through said pathways.

What I claim is:

1. An apparatus of the character described, including, in combination, a magnet having a plurality of pairs of pole pieces in staggered relation, a plurality of sections for coins or checks of various denominations or values, each section having a discharge path for improper and spurious coins and checks and a deposit pathway for proper genuine coins and checks, said pathways having a course through one pair of pole pieces whereby all coins and checks in said course break the magnetic flux lines and are variably retarded by the magnetic eddy currents thus formed, and means for deflecting the improper and spurious coins and checks into the discharge pathways, said deflecting means including a plurality of abutments located in each section and spaced apart so as to permit the free passage therebetween of proper genuine coins and to give a single deflection to the faster moving spurious and improper coins and checks and successive deflections to the slower moving ones.

2. An apparatus of the character described, including, in combination, a magnet having a plurality of pairs of pole pieces in staggered relation, a plurality of sections for coins or checks of various denominations or values, each section having a discharge path for improper and spurious coins and checks and a deposit pathway for proper genuine coins and checks, said pathways having a course through one pair of pole pieces whereby all coins and checks in said course break the magnetic flux lines and are variably retarded by the magnetic eddy currents thus formed, and means for deflecting the improper and spurious coins and checks into the discharge pathways, said deflecting means including a rod or pin located in each section in such a position as to be struck a glancing blow by the improper and spurious coins and a guiding element to insure that a slow moving article engages said rod or pin properly for discharge purposes.

3. An apparatus of the character described, including, a magnet, and having a discharge pathway for improper and spurious coins and checks and a deposit pathway for proper genuine coins and checks, said pathways starting from an insertion opening and chute which passes between the poles of said magnet, whereby the coins and checks break the magnetic flux lines and are variably retarded by the eddy currents thus formed so that they have different trajectories after passing said poles depending upon their composition, means for deflecting the slowest and fastest moving coins and checks to said discharge pathway and the coins and checks having the intermediate speed and trajectory into said deposit pathway, said deflecting means including a plurality of spaced apart abutments arranged in position to be struck glancingly by the slowest and fastest moving articles, but permitting the free passage between said abutments of proper and genuine coins.

4. An apparatus of the character described, including, a magnet and having a discharge pathway for improper and spurious coins and checks and a deposit pathway for proper genuine coins and checks, said pathways starting from an insertion opening and chute which passes between the poles of said magnet, whereby the coins and checks break the magnetic flux lines and are variably retarded by the eddy currents thus formed so that they have different trajectories after passing said poles depending upon their composition, means for deflecting the slowest and fastest moving coins and checks to said discharge pathway and the coins and checks having the intermediate speed and trajectory into said deposit pathway, said deflecting means including a plurality of rods or pins arranged in position to be struck glancingly by the slowest and fastest moving articles and spaced so as to permit the articles moving at intermediate speed to pass freely therebetween without touching any of them.

5. An apparatus of the character described, including, in combination, a magnet having a plurality of pairs of pole pieces in staggered relation, a plurality of sections for coins or checks of various denominations or values, each section having a discharge pathway for improper and spurious coins and checks and a deposit pathway for proper genuine coins and checks, said pathways having a course through one pair of pole pieces whereby all coins and checks in said course break the magnetic flux lines and are variably retarded by the magnetic eddy currents thus formed, and means for deflecting the improper and spurious coins and checks into the discharge pathways, said deflecting means including a plurality of rods or pins located in each section and spaced apart so as to permit the free passage therebetween of proper genuine coins, means to guide the slowest moving coins and checks and deflect them so that they engage one of said rods or pins and are thus deflected into the discharge path.

6. An apparatus of the character described, including in combination, a magnet having a plurality of pairs of pole pieces, a plurality of sections for coins or checks of various denominations or values, each section having a discharge pathway for improper and spurious coins and checks and a deposit pathway for proper genuine coins and checks, the pathways passing between one pair of pole pieces whereby all the coins or checks in their downward movement cut the magnetic flux lines and are variably retarded so that they have different trajectories after passing said poles depending on their composition, and means for deflecting the slowest and fastest downward moving coins and checks to the discharge pathway and the downwardly moving coins and checks having the intermediate speed and trajectory into the said deposit pathway, said deflecting means including a plurality of rods or pins arranged in position to be struck a glancing blow by the slowest and fastest moving coins or checks.

JOHN GOTTFRIED